Patented May 5, 1925.

1,536,379

UNITED STATES PATENT OFFICE.

CHARLES DICKENS, OF OAKLAND, CALIFORNIA.

CHEMICAL PRODUCT.

No Drawing. Application filed February 19, 1924. Serial No. 693,902.

*To all whom it may concern:*

Be it known that I, CHARLES DICKENS, a subject of the King of Great Britain, and a resident of Oakland, county of Alameda, and State of California, have invented a certain new and useful Chemical Product, of which the following is a specification.

The product of my invention, broadly considered, is the result of a reaction between barium and a metal of the sulphur group, that is, either selenium or tellurium. The product of my invention has many uses, probably its principal use being as a destroyer of life. I have found that the product may be used very advantageously as an insecticide and as a fungicide and that, when used on piles, serves to prevent the destruction of the piles due to the ravages of the toredo and other forms of marine life. I have also found that a dilute solution of the material is an excellent depilatory and that it has no injurious effects on the skin.

The product is made by dissolving one of the metals of the sulphur group, that is, either selenium or tellurium in an aqueous solution of barium sulphide. I do not consider sulphur as a metal and wherever in the specification I refer to the metals of the sulphur group it is to be understood that I refer to selenium and tellurium.

In accordance with my invention I first prepare a saturated aqueous solution of barium sulphide and then add the metallic selenium or tellurium to produce a saturated solution of the metal in the aqueous solution. I am not aware of the exact chemical reaction which occurs but there appears to be a reaction between the added metal and the barium and the sulphur, so that when selenium is used as the metal, the resultant product is a barium-sulpho-selenide. The solution of the barium sulphide in water may be accelerated by warming the water, but complete solution may be effected with cold water.

When the finished product is used for treating piles to prevent the ravages of the toredo and other marine animals, the solution may be forced into the piles under pressure so that it penetrates the wood or may be otherwise introduced into the piles. I have found that the product's solution is very effective in killing insects on fruit trees and that it is very effective for the treatment of piles.

I claim:

1. A chemical product comprising a barium-sulpho-selenide.

2. A chemical product comprising a solution of a metal of the sulphur group in a solution of barium sulfide.

3. A chemical product comprising a solution of selenium in an aqueous solution of barium sulfide.

4. A chemical product comprising a reagent comprising barium, sulphur and a metal of the sulphur group.

In testimony whereof. I have hereunto set my hand.

CHARLES DICKENS.